United States Patent
Lai et al.

(10) Patent No.: US 11,234,110 B2
(45) Date of Patent: Jan. 25, 2022

(54) BLUETOOTH COMMUNICATION METHOD AND COMMUNICATION DEVICE

(71) Applicant: MediaTek Singapore Pte. Ltd., Singapore (SG)

(72) Inventors: Wei-Chu Lai, Hsin-Chu (TW); Wei-Lun Wan, Hsin-Chu (TW); Fei Kong, Sichuan (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/944,160

(22) Filed: Jul. 31, 2020

(65) Prior Publication Data
US 2021/0037366 A1 Feb. 4, 2021

(30) Foreign Application Priority Data

Aug. 1, 2019 (CN) .......................... 201910708508.X (51) Int. Cl.
*H04W 4/80* (2018.01)
*H04W 76/14* (2018.01)

(52) U.S. Cl.
CPC ............. *H04W 4/80* (2018.02); *H04W 76/14* (2018.02)

(58) Field of Classification Search
CPC combination set(s) only.
See application file for complete search history.

(56) References Cited

U.S. PATENT DOCUMENTS

| | | | | |
|---|---|---|---|---|
| 5,349,682 | A * | 9/1994 | Rosenberry | G06F 9/3001 712/31 |
| 2009/0178040 | A1* | 7/2009 | Cho | H04L 12/282 718/100 |
| 2011/0047266 | A1* | 2/2011 | Yu | H04L 67/2814 709/224 |
| 2016/0065758 | A1* | 3/2016 | Kang | H04N 1/00392 358/1.15 |
| 2016/0360341 | A1* | 12/2016 | Srivatsa | H04L 67/104 |
| 2017/0352002 | A1* | 12/2017 | Lam | G01V 15/00 |
| 2018/0020004 | A1 | 1/2018 | Ferguson | |
| 2018/0063367 | A1* | 3/2018 | Kitayama | G03G 15/5087 |
| 2018/0132092 | A1* | 5/2018 | Choi | H04W 4/80 |
| 2018/0176851 | A1* | 6/2018 | Lim | H04W 68/00 |
| 2019/0166649 | A1* | 5/2019 | Arrizza | H04W 4/02 |

(Continued)

FOREIGN PATENT DOCUMENTS

| | | |
|---|---|---|
| CN | 105324754 A | 2/2016 |
| EP | 3 147 747 A1 | 3/2017 |

(Continued)

*Primary Examiner* — Cindy Trandai
(74) *Attorney, Agent, or Firm* — Winston Hsu (57) ABSTRACT

A bluetooth communication method includes: a first communication device establishing bluetooth connection with a second communication device, wherein the first communication device is configured to execute multiple tasks; the first communication device communicating with the second communication device through the bluetooth connection, to allocate at least one task of the multiple tasks to the second communication device for execution; wherein the at least one task includes a scan task; and the first communication device receiving an execution result of the at least one task from the second communication device through the bluetooth connection.

9 Claims, 6 Drawing Sheets

(56) References Cited

U.S. PATENT DOCUMENTS

| | | | |
|---|---|---|---|
| 2020/0128017 A1* | 4/2020 | Fox | H04L 43/065 |
| 2020/0196299 A1* | 6/2020 | Liu | H04L 69/24 |
| 2020/0218570 A1* | 7/2020 | Schlegel | G06F 9/4881 |
| 2020/0322871 A1* | 10/2020 | Ernst | H04W 84/20 |
| 2021/0029528 A1* | 1/2021 | Huang | H04W 8/005 |

FOREIGN PATENT DOCUMENTS

| | | |
|---|---|---|
| KR | 10-1902037 | 9/2018 |
| WO | 2014/197336 A1 | 12/2014 |

* cited by examiner

BLUETOOTH COMMUNICATION METHOD AND COMMUNICATION DEVICE

BACKGROUND

Technical Field

Embodiment disclosed in the present invention relates to the field of communication, and more particularly, to a bluetooth communication method and a communication device.

With the development, bluetooth 5.0 further includes the bluetooth Low Energy (BLE) Advertising Extensions technology, which increases the difficulty and time consumed for the bluetooth device to execute the BLE SCAN. The bluetooth device has multiple tasks and executes the multiple tasks in time division multiplexing manner. Therefore, the new features added to bluetooth 5.0 can be challenging to the time allocation of bluetooth devices. In addition, a bluetooth device may encounter many problems when dealing with multiple tasks, for example, some tasks might not be allocated with enough time, and thus multiple different tasks might compete for limited time. Hence, in some complex scenarios, the bluetooth device cannot perfectly handle multiple tasks.

SUMMARY

According to embodiments of the present invention, the present invention provides a bluetooth communication method and an associated communication device to solve the aforementioned problem.

According to the present invention a first aspect, a bluetooth communication method is disclosed. The bluetooth communication method comprises: a first communication device establishing a bluetooth connection with a second communication device, wherein the first communication device is configured to execute multiple tasks; the first communication device communicating with the second communication device through the bluetooth connection, to allocate at least one task of the multiple tasks to the second communication device for execution; wherein the at least one task comprises a scan task; and the first communication device receiving an execution result of the at least one task from the second communication device through the bluetooth connection.

According to a second aspect of the present invention, a bluetooth communication method is disclosed. The bluetooth communication method comprises: a second communication device establishing bluetooth connection with a first communication device; the second communication device communicating with the first communication device through the bluetooth connection, and receiving an indication for executing at least one task of the first communication device; the second communication device executing the at least one task; and the second communication device sending an execution result of the at least one task to the first communication device through the bluetooth connection.

According to the third aspect of the present invention, an exemplary communication device is disclosed. The communication device includes a processor and a communication circuit. The communication circuit is capable of communicating with another communication device. The processor is communicatively coupled to the communication circuit. The processor may be capable of communicating with the another communication device through the bluetooth connection via the communication circuit, to allocate at least one task of the multiple tasks to the another communication device for execution, wherein the at least one task comprises a scan task. The processor may further be capable of receiving an execution result of the at least one task from the another communication device through the bluetooth connection via the communication circuit.

Advantages provided by the present invention includes that the first communication device allocates at least one task to the second communication device for execution through a bluetooth connection, wherein the at least one task comprises the scan task, so that the first communication device may receive the execution result of the scan task from the second communication device. In this way, the first communication device may obtain the execution result of the scan task merely through the bluetooth connection.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, when multiple tasks are processed, the communication device may encounter the problem that a specific task is not allocated with sufficient time.

For example, in a first scenario, a specific communication device needs to perform the following functions: the WiFi function, using a bluetooth earphone/headset to play the music, and searching and connecting to a bluetooth wristband. The WiFi function is enabled by the WiFi module of the communication device to execute the WiFi task. The bluetooth module of the communication device executes the A2DP task so that the bluetooth earphone/headset can play the music. Further, the bluetooth module of the communication searches and connects the bluetooth wristband by executing the BLE SCAN task. Please note that the bluetooth module and the WiFi module may be integrated in a single chip. Meanwhile, the detail of the communication device allocating time for the three tasks is: WiFi (30%)+ A2DP (50%)+BLE SCAN (20%). As can be seen from the above, since the priorities of the WiFi task and the A2DP task are higher than the BLE SCAN task, the time allocated to the BLE SCAN task is sacrificed to be down to 20% in order to maintain the WiFi task and the A2DP task.

Further, in a second scenario, a specific communication device may need to perform the following functions at the same time: the WiFi function, using the bluetooth earphone/headset to make a "WeChat" voice call, and receiving information from other devices. The WiFi function is enabled by the WiFi module of the communication device to execute the WiFi task. The bluetooth module of the communication device executes the eSCO task so that the bluetooth earphone/headset can perform the WeChat voice call. Receiving the information of other communication devices represents using the bluetooth module of the communication device to execute the BLE SCAN task. Meanwhile, the detail of the communication device allocating time for the three tasks is: WiFi (56%)+eSCO (33%)+BLE SCAN (11%). As can be seen from the above, since the priorities of the WiFi task and the eSCO task are both higher than that of the BLE SCAN task, the time allocated to the BLE SCAN task is sacrificed to be down to only 11% in order to maintain the WiFi task and the A2DP task.

However, with the development of the bluetooth technology, the time required for the communication device to execute the BLE SCAN task has increased to about 40%, and in the two scenarios mentioned above, the time of executing the BLE SCAN task is insufficiently allocated, thus when the BLE SCAN task is executed, problems such as failing to find the specified device happen frequently.

Hence, in some scenarios, the communication device might face the problem of executing multiple tasks. Meanwhile, the communication device cannot ensure the multiple tasks are allocated for correspondingly sufficient time for execution, that is, the communication device cannot perfectly deal with the multiple tasks.

In view of this, the present invention provides a bluetooth communication method for solving the problem under the above-mentioned situation. In order to give those skilled in the art better understanding in the technical solutions of the present invention, the following detailed descriptions and the corresponding figures can be referenced.

Figure 1:
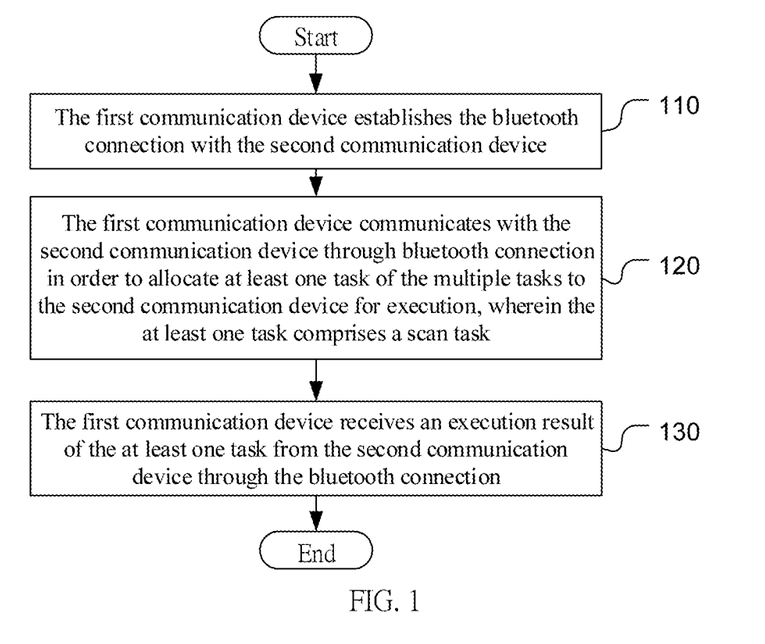
FIG. 1 is a flowchart illustrating a bluetooth communication method according to a first embodiment of the present invention.

FIG. 1 is a flowchart illustrating a bluetooth communication method according to a first embodiment of the present invention. As shown in FIG. 1, the main device for executing the bluetooth communication method may be the first communication device, wherein the first communication device may be a bluetooth chip or a mixed-type chip (which comprises a bluetooth module and a WiFi module), a device that comprises a bluetooth chip, or a device that comprises a mixed-type chip, such as a smartphone.

In an example, the first communication device determines whether to start to execute the bluetooth communication method through a predetermined approach, e.g., User interface (UI)/Application Programming Interface (API)/host setting/test control interface (tci) command/host control interface (hci) command. For example, the first communication device may use the tci_collaborator_enable command to determine whether the bluetooth communication method is executed. After the Host layer of the first communication device sends the tci_collaborator_enable command to the Link Layer (LL), the bluetooth communication method is executed.

Specifically, as shown in FIG. 1, the bluetooth communication method comprises:

Step 110: the first communication device establishes the bluetooth connection with the second communication device.

The first communication device needs to execute multiple tasks in order to perform multiple functions, such as the WiFi task, A2DP task, eSCO task, BLE SCAN task mentioned in the above scenario, etc. The second communication device may be a bluetooth chip or a mixed-type chip (which comprises a bluetooth module and a WiFi module), or a device that comprises a bluetooth chip, e.g. a smartphone, etc. the second communication device may be in a state that no task is being executed, or in a state that a task is being executed.

In an embodiment, the second communication device may determine whether to assist other devices to execute some tasks through a predetermined approach, such as setting UI/API/host settings/tci command/hci command. For example, the second communication device may assist the first communication device to execute the bluetooth communication method through the tci_collaborator_enable command. The host layer of the second communication device may send the tci_collaborator_enable command to the Link layer (LL), in order to assist the first communication device to execute the bluetooth communication method.

Step 120: the first communication device communicates with the second communication device through bluetooth connection in order to allocate at least one task of the multiple tasks to the second communication device for execution, wherein the at least one task comprises a scan task which can relate to scan/inquiry operations.

Please note that when the time allocated by the first communication device for the at least one task is not sufficient, which makes the at least one task unable to be fully executed, or makes the execution result of the at least one task unsatisfactory. The insufficient time allocation for the at least one task may be resulted from that the priority of the at least one task is relatively low, or the predetermined time for the at least one task is insufficient.

The remaining tasks in the multiple tasks may be executed by the first communication device itself; or a portion of the remaining tasks in the multiple tasks maybe executed by the first communication device itself, while the rest portion of the remaining tasks are executed by another communication device.

In an embodiment, both the first communication device and the second communication device have elements for playing music, and the at least one task may further comprise an A2DP task.

Step 130: the first communication device receives an execution result of the at least one task from the second communication device through the bluetooth connection.

The execution result of the scan task is a search result, which comprises: the identifier of the communication device found near the first communication device and the second communication device. In this embodiment, the distance between the first communication device and the second communication device is smaller than a predetermined distance and therefore the first communication device is close to the second communication device, so that the search result obtained from the second communication device executing the scan task may be substantially identical to the search result performed by the first communication device itself. With this arrangement, the first communication device may make use of search result obtained from the second communication device executing the scan task.

In this embodiment, through communicating with the second communication device via establishing bluetooth connection, the first communication device is able to allocate at least one task of the multiple tasks to the second communication device for execution, wherein the at least one task comprises the scan task, and the remaining tasks are executed by the first communication device itself, so that the first communication device may receive the execution result of the scan task. Hence, the first communication device may obtain the search result from executing the scan task via merely bluetooth connection, which multiple tasks can be perfectly executed.

In the following, specific scenarios are provided for illustrating the technical effects of the present invention, wherein the second communication device is assumed in the state that no task is being executed.

In the aforementioned first scenario, the first communication device needs to execute the WiFi task, the A2DP task and the BLE SCAN task. In addition, after the first communication device executes the bluetooth communication method of the present invention embodiment, the tasks executed by the first communication device include the WiFi task, the A2DP task and the BLE link task. In addition, the tasks executed by the second communication device include the BLE SCAN task and the BLE link task, wherein the BLE link task is utilized to establish bluetooth connection between the first communication device and the second communication device. Meanwhile, the time allocation of the aforementioned tasks may be as follows:

The first communication device allocates time of the tasks executed by the first communication device as follows:

WiFi(35%)+A2DP(55%)+BLE link(10%),

The second communication device allocates time of the tasks executed by the second communication device as follows:

BLE SCAN(90%)+BLE link(10%).

In the scenario mentioned above, the first communication device needs to execute the WiFi task, the eSCO task and the BLE SCAN task. After the first communication device executes the bluetooth communication method of the present invention embodiment, the tasks executed by the first communication device include the WiFi task, the eSCO task and the BLE link task. In addition, the tasks executed by the second communication device include the BLE SCAN task and the BLE link task, wherein the BLE link task is utilized to establish bluetooth connection between the first communication device and the second communication device. Meanwhile, the time allocation of the aforementioned tasks may be as follows:

The first communication device allocates time of the tasks executed by the first communication device as follows:

WiFi(35%)+eSCO(55%)+BLE link(10%),

The second communication device allocates time of the tasks executed by the second communication device as follows:

BLE SCAN(90%)+BLE link(10%).

As can be seen from the above scenario, the time allocated for the BLE SCAN task has reached 90%, while the time allocated to the other task is sufficient. That is, by merely establishing bluetooth connection with the second communication device, the first communication device can obtain the result from executing the BLE SCAN task. Meanwhile, the first communication device also can execute other tasks. Therefore, the aforementioned task can be perfectly executed in different scenarios, thus the problem of insufficient time allocation for a specific task is avoided.

It should be noted that although the examples described in the above are illustrated using time-division multiplexing of bluetooth and WiFi, those skilled in the art is readily to understand that the present invention is not limited to this. The applied bluetooth and WiFi may also be frequency-division multiplexing. In the scenario of bluetooth and WiFi frequency-division multiplexing, the technical solution of the present invention may also be applied.

Figure 3:
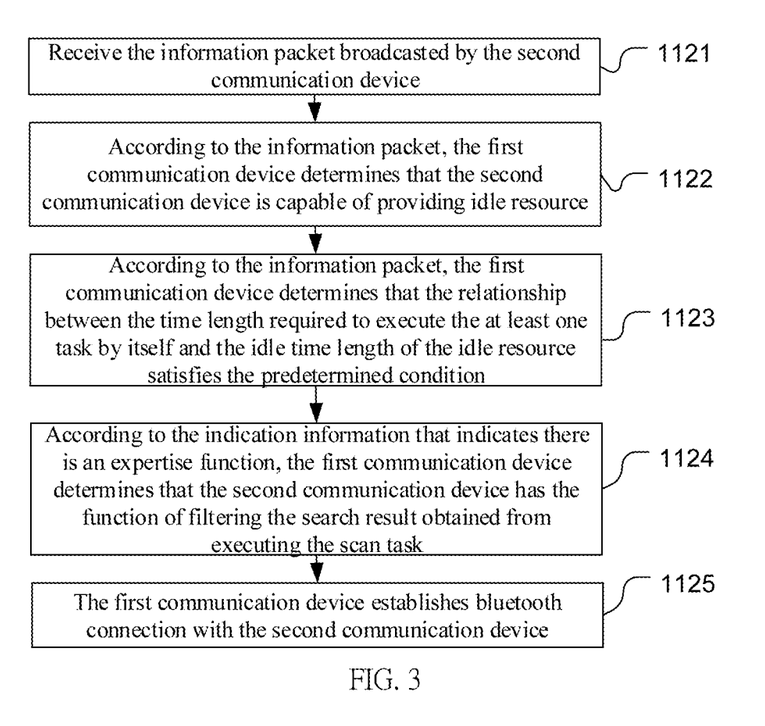
FIG. 3 is a flowchart illustrating a bluetooth communication method according to a third embodiment of the present invention.
Figure 4:
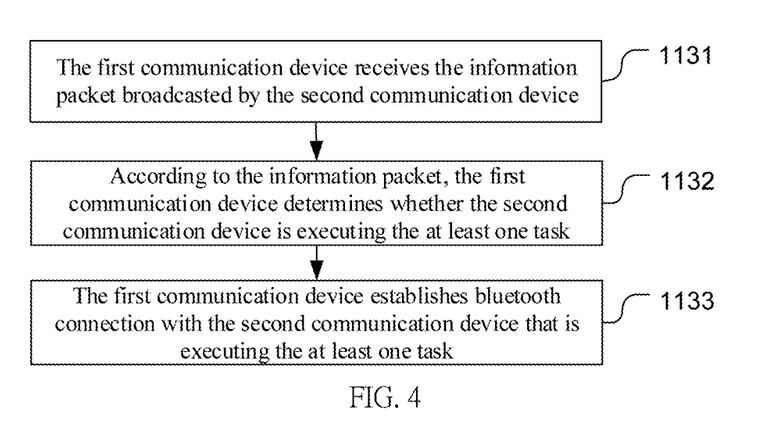
FIG. 4 is a flowchart illustrating a bluetooth communication method according to a fourth embodiment of the present invention.

Specifically, Step 110 further comprises: receiving the information packet broadcasted by the second communication device, wherein the information packet at least comprises: the indication information for indicating whether the at least one task can be executed or not by the second communication device. The first communication device refers to the information packet to determine whether the second communication device can execute the at least one task, and when it is determined that the second communication device can execute the at least one task, the first communication device establishes bluetooth connection with the second communication device capable of executing the at least one task. Specific execution approaches of Step 110 are shown in FIG. 2, FIG. 3 and FIG. 4.

Figure 2:
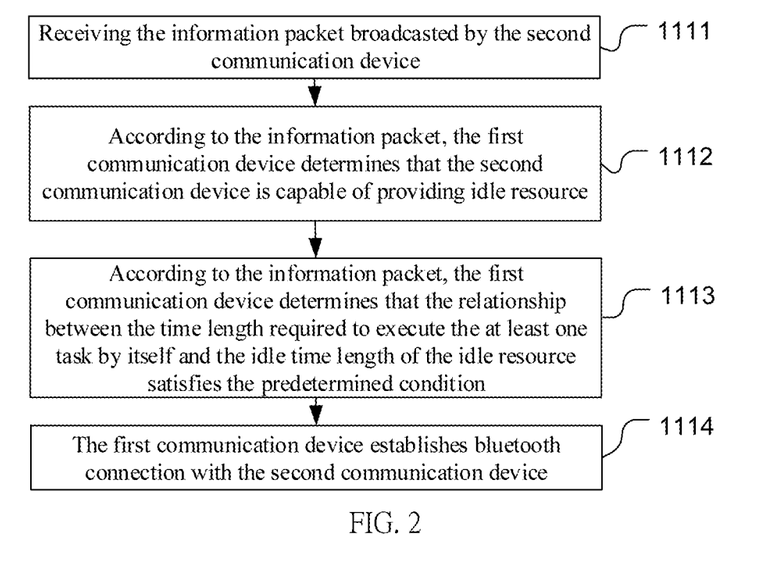
FIG. 2 is a flowchart illustrating a bluetooth communication method according to a second embodiment of the present invention.

FIG. 2 is a flowchart illustrating a bluetooth communication method according to a second embodiment of the present invention. As shown in FIG. 2, based on the above-mentioned first embodiment, Step 110 further comprises:

Step 1111: receiving the information packet broadcasted by the second communication device, wherein the information packet comprises: the indication information that indicates whether the second communication device can provide the idle resource, and the indication information that indicates the idle time length of the idle resource which can be provided by the second communication device, wherein the idle resource refers to the idle bluetooth communication frequency band, that is, the idle bluetooth communication frequency band where there is no associated bluetooth task being executed. The idle bluetooth communication frequency band may comprise the channel 37, channel 38 and/or channel 39. The idle bluetooth communication frequency band may also include other bluetooth communication channels.

In an embodiment, the information packet may be advertising message or connectionless subordinate broadcast (CSB) message.

Step 1112: According to the information packet, the first communication device determines that the second communication device is capable of providing idle resource.

Step 1113: According to the information packet, the first communication device determines that the relationship between the time length required to execute the at least one task by itself and the idle time length of the idle resource satisfies the predetermined condition.

In an embodiment, the idle time length of the idle resource provided by the second communication device in Step 1111 can be expressed as: a ratio of the idle time of the idle resource to a communication period. The time length required for the first communication device to execute at least one task can be expressed as: a ratio of the time for executing the at least one task that occupies the bluetooth communication frequency band to a communication period.

In an embodiment, the predetermined condition comprises: the idle time length of the idle resource is larger than or equal to the time length required for the first communication device to execute the at least one task, and/or the idle time length of the resource is smaller than time length required for the first communication device to execute the at least one task, wherein the difference between the idle time length and the time length required is smaller than or equal to a predetermined value. For example, the idle time length of the idle resource of the second communication device is 40%, and the time length required by the first communication device to execute the at least one task is 50%, and the predetermined value is 10%. In this situation, the predetermined condition can be satisfied.

Step 1114: the first communication device establishes bluetooth connection with the second communication device.

When the relationship between the time length required by the first communication device to execute the at least one task and the idle time length of the idle resource satisfies the predetermined condition, the first communication device will determine to establish the bluetooth connection with the second communication device, and send a respond signal to the second communication device, so that the first communication device may establish the bluetooth connection with the second communication device. In addition, the respond signal may be a bluetooth connection establishment requesting message.

When the relationship between the time length required by the first communication device to execute the at least one task and the idle time length of the idle resource does not satisfy the predetermined condition, the first communication device determines not to establish bluetooth connection with the second communication device and not to send the respond signal.

In an alternative embodiment, the execution of Step 1113 can be omitted, that is, as long as the second communication device is able to provide the idle resource, the first communication device can establish bluetooth connection with the second communication device.

FIG. 3 is a flowchart illustrating a bluetooth communication method according to a third embodiment of the present invention. As shown in FIG. 3, based on the aforementioned first embodiment, Step 110 further comprises:

Step 1121: receive the information packet broadcasted by the second communication device, wherein the information packet comprises: the indication information that indicates whether the second communication device is capable of providing the idle resource, the indication information that indicates the idle time length of the idle resource that can be provided by the second communication device, and the indication information that indicates whether there is an expertise function.

The expertise function at least comprises: a function that filters the search result obtained from executing the scan task. More specifically, it means the second communication device can execute the scan task to obtain the search result, and perform filtering on the search result according to filtering condition sent from the first communication device, wherein the filtering condition may comprise: the identifier of device that the first communication device expects to scan, and/or a signal strength indication that indicates the signal strength of the device that the first communication device expects to scan. In this way, when the filtering condition comprises the identifier of the device that the first communication device expects to scan, the second communication device finds, from the search result, the device identified by the identifier of the device that the first communication device needs to scan. When the filtering condition comprises the signal strength indication of the device that the first communication device expects to scan, the second communication device finds a certain device from the search result, wherein the certain device has the signal strength detected when the second communication device scans is higher than or equal to the signal strength of device indicated by the signal strength indication.

The expertise function may further comprise: the address-resolution function, which is capable of resolving the address of the searched specific device according to a key provided by the first communication device. For example, the first communication device may be a smartphone, which is already paired to a private device thereof (e.g. a bluetooth earphone/headset). Since the bluetooth earphone/headset is a private device of the smartphone, not all devices on the internet can resolve the address of the bluetooth earphone/headset. Instead, it can only be resolved with the key. If the second communication device has the address-resolution function, the second communication device in the follow-up scanning may resolve the address of the bluetooth earphone/headset according to the key provided by the first communication device, thereby assisting the smartphone to find the bluetooth earphone/headset.

Step 1122—Step 1123 are substantially identical to Step 1112—Step 1113.

Step 1124: According to the indication information that indicates there is an expertise function, the first communication device determines that the second communication device has the function of filtering the search result obtained from executing the scan task.

Step 1125: the first communication device establishes bluetooth connection with the second communication device.

Specifically, when the relationship between the time length required by the first communication device to execute the at least one task and the idle time length of the idle resource satisfies the predetermined condition, and the second communication device has the function of filtering on the search result obtained from executing the scan task, the first communication device may establish bluetooth connection with the second communication device. The detailed bluetooth connection establishing approach is identical to those mentioned in the aforementioned embodiments, and is omitted here for brevity.

In an alternative approach, Step 1124 may comprise: the first communication device determines that the second communication device has the address-resolution function according to the indication information which indicates there is an expertise function.

Step 1125 may comprise: when the relationship between the time length required by the first communication device to execute the at least one task and the idle time length of the idle resource satisfies the predetermined condition, and the second communication device has the address-resolution function, the first communication device will establish bluetooth connection with the second communication device.

FIG. 4 is a flowchart illustrating a bluetooth communication method according to a fourth embodiment of the present invention. Based on the first embodiment, Step 110 shown in FIG. 4 further comprises:

Step 1131: the first communication device receives the information packet broadcasted by the second communication device, wherein the information packet comprises: the indication information that indicates a task being executing by the second communication device;

Step 1132: according to the information packet, the first communication device determines whether the second communication device is executing the at least one task; and Step 1133: the first communication device establishes bluetooth connection with the second communication device that is executing the at least one task.

Alternatively, in Step 1131, the information packet further comprises: the indication information which indicates the time length required for the task being executed by the second communication device, wherein the time length required for the task being executed by the second communication device may comprise: the ratio of a predetermined time to a communication period, and the predetermined time is that the task being executed by the second communication device occupies the bluetooth communication frequency band. Meanwhile, the method further comprises: the first communication device determines whether the relationship between the time length required by the first communication device to execute the at least one task and the time length required for the task being executed by the second communication device satisfies the predetermined condition.

In an embodiment, the predetermined condition comprises: when the time length required for the task being executed by the second communication device is larger than or equal to the time length required by the first communication device to execute the at least one task; and/or, the predetermined condition comprises: when the time length required for the task being executed by the second communication device is smaller than the time length required by the first communication device to execute the at least one task, and the difference between the two is smaller than or equal to predetermined value. For example, the time length required for the task being executed by the second communication device may be 40%, the time length required by the first communication device to execute the at least one task may be 50%, and the predetermined value may be 10%. In this situation, the predetermined condition is satisfied.

When the relationship between the time length required by the first communication device to execute the at least one task and the time length required for the task being executed by the second communication device satisfies a predetermined condition, the first communication device determines to establish bluetooth connection with the second communication device, and sends a respond signal to the second communication device, thus the bluetooth connection established between the first communication device and the second communication device is established, wherein the respond signal may be a bluetooth connection establishment requesting message.

When the relationship between the time length required by the first communication device to execute the at least one task and the time length required for the task being executed by the second communication device does not satisfy the predetermined condition, the first communication device determines not to establish bluetooth connection with the second communication device, and not to send the respond signal. In this way, the first communication device will not establish bluetooth connection with the second communication device.

Figure 5:
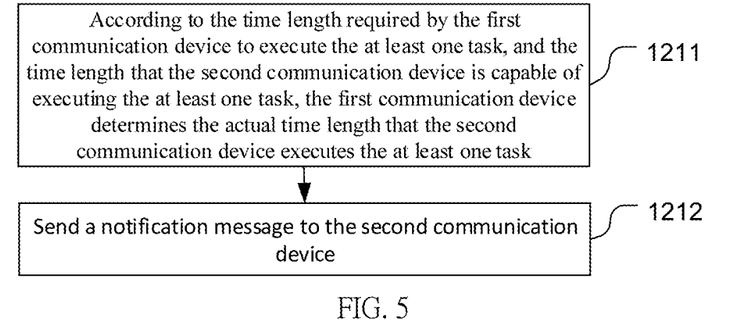
FIG. 5 is a flowchart illustrating a bluetooth communication method according to a fifth embodiment of the present invention.

FIG. 5 is a flowchart illustrating a bluetooth communication method according to a fifth embodiment of the present invention. Based on the first embodiment, Step 120 shown in FIG. 5 comprises:

Step 1211: according to the time length required by the first communication device to execute the at least one task, and the time length that the second communication device is capable of executing the at least one task, the first communication device determines the actual time length that the second communication device executes the at least one task, wherein the at least one task comprises a scan task.

In an embodiment, after the second communication device broadcasts the information packet, if the second communication device does not receive any request for reserving an idle resource and an idle time from a communication device other than the first communication device, or does not agree with any request for reserving an idle resource and an idle time from a communication device other than the first communication device, the time length that the second communication device is capable of executing the at least one task may be the idle time length indicated in the broadcasted message. After the second communication device broadcasts the information packet, if the second communication device receives a request for reserving an idle resource and an idle time from a communication device other than the first communication device, and also agrees with the request for reserving an idle resource and an idle time from the communication device other than the first communication device, the time length that the second communication device is capable of executing the at least one task is the idle time length indicated in the broadcasted message minus the reserved time length.

When the time length that the second communication device is capable of executing the at least one task is larger than the time length required by the first communication device to execute the at least one task, the actual time length may be the time length required by the first communication device to execute the at least one task. When the time length that the second communication device is capable of executing the at least one task is smaller than the time length required by the first communication device to execute the at least one task, and the difference between the two is smaller than a predetermined value, the actual time length may be the time length where the second communication device is capable of executing the at least one task.

Step 1212: Send a notification message to the second communication device, wherein the notification message comprises: the indication information for indicating to execute the at least one task of the first communication device, and the indication information for indicating that the actual time length that the second communication device executes the at least one task.

Alternatively, the method further comprises: determining a specific channel for which the scan task is executed; when there are a plurality of specific channels, the method will determine the time length corresponding to each of the specific channels, wherein the actual time length equals to the summation of the time length corresponding to each of the specific channels.

The indication information for indicating the actual time length that the second communication device executes the at least one task comprises: the indication information that indicates specific channels for which the scan task is executed, and the time length corresponding to each specific channel.

Alternatively, the notification message in Step 1212 further comprises: the indication information that indicates the expertise function which needs to be executed. The expertise function at least comprises: a function of filtering the search result obtained from executing the scan task. In addition, the expertise function may further comprise: an address-resolution function.

Alternatively, the notification message in Step 1212 further comprises: the indication information that indicates the number of devices to be searched. The above indication information indicates that the second communication device will automatically report the search result to the first communication device after the number of devices are found.

Alternatively, the notification message in Step 1212 further comprises: a communication interval which indicates that the first communication device sends a message to the second communication device every predetermined interval, in order to check whether the second communication device has finished the at least one task.

Alternatively, based on the aforementioned embodiments, one step may be inserted before Step 130, which is:

Step 130*a*: the first communication device check whether the second communication device has finished the at least one task through bluetooth connection.

In an embodiment, the first communication device may check whether the second communication device has finished the at least one task every predetermined interval.

In an embodiment, one step may be added before Step 130*a*: the first communication device maintains the bluetooth connection between itself and the second communication device. It is noted that this step and maintaining the bluetooth connection may be prior to Step 130.

In an embodiment, the first communication device may check whether the second communication device has finished the at least one task through CSB approach. In another embodiment, the first communication device may check whether the second communication device has finished the at least one task through the advertising extension approach.

Figure 6:
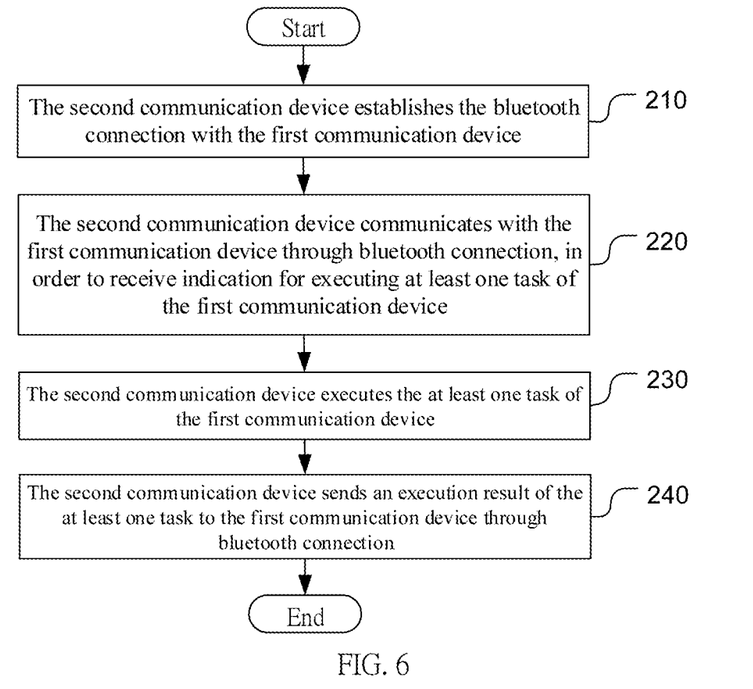
FIG. 6 is a flowchart illustrating a bluetooth communication method according to a sixth embodiment of the present invention.

FIG. 6 is a flowchart illustrating a bluetooth communication method according to a sixth embodiment of the present invention. The bluetooth communication method may be executed by the second communication device, and the second communication device may be a bluetooth chip or a mixed-type chip (which comprises a bluetooth module and a WiFi module), a device that comprises a bluetooth chip, or a device that comprises a mixed-type chip, e.g. smartphone, etc.

In an embodiment, the second communication device may determine whether to execute the bluetooth communication method through a predetermined approach, in order to determine whether to assist other devices to execute some tasks, e.g., setting the UI/API/host setting/tci command/hci command. For example, the second communication device may be controlled to execute the bluetooth communication method through the tci_collaborator_enable command, wherein the Host layer of the second communication device may send the tci_collaborator_enable command to the Link layer (LL) in order to execute the bluetooth communication method.

Specifically, as shown in FIG. 6, the bluetooth communication method comprises:

Step 210: the second communication device establishes the bluetooth connection with the first communication device.

The second communication device maybe in a state that no task is being executed (non-executing-task state), or in a state that a task is being executed (executing-task state). The first communication device may execute multiple tasks, e.g. the WiFi task, A2DP task, eSCO task, BLE SCAN task, etc., as mentioned in the above scenarios.

Step 220: the second communication device communicates with the first communication device through bluetooth connection, in order to receive indication for executing at least one task of the first communication device.

The at least one task may comprises a scan task, e.g., Scan/Inquiry.

The time that the first communication device allocates to the at least one task maybe insufficient, resulting in that the at least one task cannot be completely executed, or the execution result of the at least one task is not ideal. The reason why the time allocated to the at least one task is insufficient may be due to the low priority of the at least one task, or due to that the predetermined time for the at least one task is not long enough.

In an embodiment, both the first communication device and the second communication device have elements capable of playing music, and the at least one task of the multiple tasks may further comprise an A2DP task.

Step 230: the second communication device executes the at least one task of the first communication device.

Step 240: the second communication device sends an execution result of the at least one task to the first communication device through bluetooth connection, wherein the at least one task comprises a scan task.

The execution result of the scan task comprises: the identifier of the communication device found near the first and second communication devices. In this embodiment, the distance between the first communication device and the second communication device is smaller than predetermined distance, and thus the first communication device and the second communication device are close to each other. In this way, the search result obtained from the second communication device executing the scan task maybe substantially identical to that obtained from the first communication device executing the scan task, so that the first communication device may make use of search result obtained from the second communication device executing the scan task.

It is noted that the execution order of Step 230 and Step 210 do not necessarily follow the numeral orders thereof. For example, Step 230 may be performed before Step 210, or Step 230 may be simultaneously executed with Step 210.

In this embodiment, the second communication device establishes bluetooth connection with the first communication device, and communicates with the first communication device through the bluetooth connection in order to receive the indication for executing at least one task of the first communication device, execute the at least one task of the first communication device, and send the execution result of the at least one task to the first communication device, and thereby the first communication device may obtain the execution result of the at least one task via merely bluetooth connection.

Figure 7:
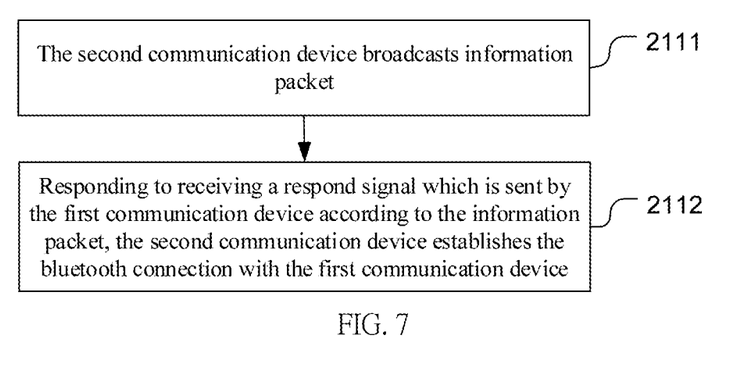
FIG. 7 is a flowchart illustrating a bluetooth communication method according to a seventh embodiment of the present invention.

FIG. 7 is a flowchart illustrating a bluetooth communication method according to a seventh embodiment of the present invention. Based on the aforementioned sixth embodiment, Step 210 shown in FIG. 7 further comprises:

Step 2111: the second communication device broadcasts information packet that at least comprises: the indication information for indicating whether the second communication device is capable of executing the at least one task.

The indicating information used for indicating whether the second communication device is capable of executing the at least one task comprises: the indication that indicates whether the second communication device is capable of providing the idle resource.

Step 2112: Responding to receiving a respond signal which is sent by the first communication device according to the information packet, the second communication device establishes the bluetooth connection with the first communication device. The respond signal may be a bluetooth connection establishing request.

More specifically, in an embodiment, the information packet may comprise: indication that indicates whether the second communication device is capable of providing the idle resource, and the indication information that indicates the idle time length of the idle resource that can be provided by the second communication device. Meanwhile, the respond signal in Step 212 is sent when the relationship between the time length required by the first communication device to execute the at least one task and the idle time length of the idle resource satisfies the predetermined condition. Since some predetermined conditions are similar to those mentioned in the above embodiments, they are omitted here for brevity.

The indication information that indicates the idle time length of the idle resource that can be provided by the second communication device may be expressed as: the ratio of the idle time length of the idle resource to a communication period. In addition, the time length required by the first communication device to execute the at least one task may be expressed as: a ratio of the time required by the first communication device to execute the at least one task that occupies the bluetooth communication frequency band to a communication period.

In an embodiment, the information packet specifically comprises: the indication information that indicates whether the second communication device is capable of providing the idle resource, the indication information that indicates the idle time length of the idle resource that can be provided by the second communication device, and the indication information that indicates whether there is an expertise function. The associated descriptions about the expertise function can be seen in the aforementioned embodiments, and thus are omitted here for brevity. In this embodiment, the respond signal in Step 212 is sent by the first communication device when the relationship between the time length required to execute the at least one task and the idle time length of the idle resource satisfies the predetermined condition, and the second communication device is determined to have the expertise function.

In an embodiment, the indicating information within the information packet that indicates whether the second communication device is capable of executing the at least one task comprises: the indication information that indicates the task that is being executed by the second communication device. Meanwhile, in this embodiment, the respond signal in Step 212 is sent by the first communication device when determining that the second communication device is executing the at least one task.

In an embodiment, Step 220 comprises: the second communication device negotiates with the first communication device through bluetooth connection, and receives a notification message from the first communication device. The notification message comprises indication information for indicating the second communication device to execute the at least one task and indication information for indicating the actual time length that the second communication device executes the at least one task. In the above step, the second communication device may report the time length that the second communication device is capable of executing the at least one task to the first communication device. After broadcasting the information packet, if the second communication device does not receive any request for reserving idle resource and idle time from any communication device other than the first communication device, or does not agree with any request for reserving idle resource and idle time from any communication device other than the first communication device, the time length for executing the at least one task may be the idle time length indicated in the broadcasted message. After the second communication device broadcasts the information packet, if the second communication device receives the request for reserving idle resource and the idle time from any communication device other than the first communication device, and agrees with the request for reserving idle resource and the idle time from any communication device other than the first communication device, the time length that the second communication device is capable of executing the at least one task may be the idle time length indicated in the broadcasted message minus the reserved time length. The actual time length sent by the first is determined according to the time length that the second communication device is capable of executing the at least one task as well as the time length that the first communication device executes the at least one task.

The notification message may further comprise: the indication information for indicating the expertise function to be executed, wherein the expertise function at least comprises: a function of filtering the search result obtained from executing the scan task. Meanwhile, the notification message further comprises: a filtering condition that may comprise: the identifier of device which the first communication device expects to scan, and/or a signal strength indication of the signal strength of a device that the first communication device expects to scan. The expertise function may further comprise an address-resolution function, and the notification message further comprises a key needed for executing the address-resolution function. The notification message may further comprise: the indication information for indicating the number of devices to be searched, the notification message may further comprise a communication interval.

In an embodiment, Step 230 comprises: the second communication device executes a scan operation according to the actual time length to obtain the search result, so that the execution result of the at least one task sent in Step 240 is the search result. If the indication information of the notification message indicates that there is a need for filtering the search result obtained from executing the scan task, the second communication device will filter the search result according to the filtering condition sent by the first communication device, so that the execution result of the at least one task sent in Step 240 is the filtered search result. If the indication information of the notification message further indicates that there is a need for executing the address-resolution function, the second communication device will utilize the key sent by the first communication device to perform address resolution upon devices in the search result that have encrypted addresses, to obtain the real addresses of the devices that have encrypted addresses. Hence, the execution result of the at least one task sent in Step 240 shows the searched devices that have real addresses.

Figure 8:
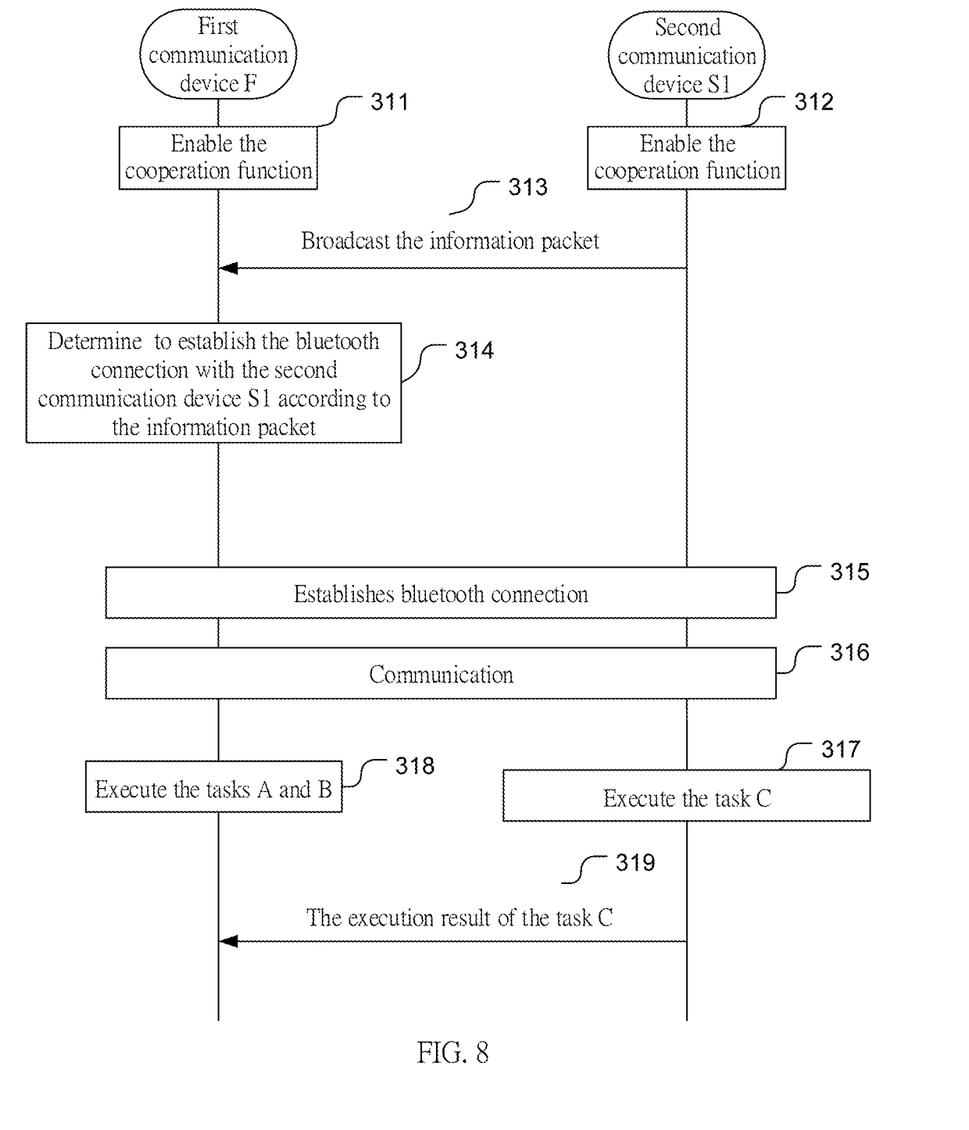
FIG. 8 illustrates an exemplary process of the bluetooth communication between the first communication device and the second communication device according to an embodiment of the present invention.
Figure 9:
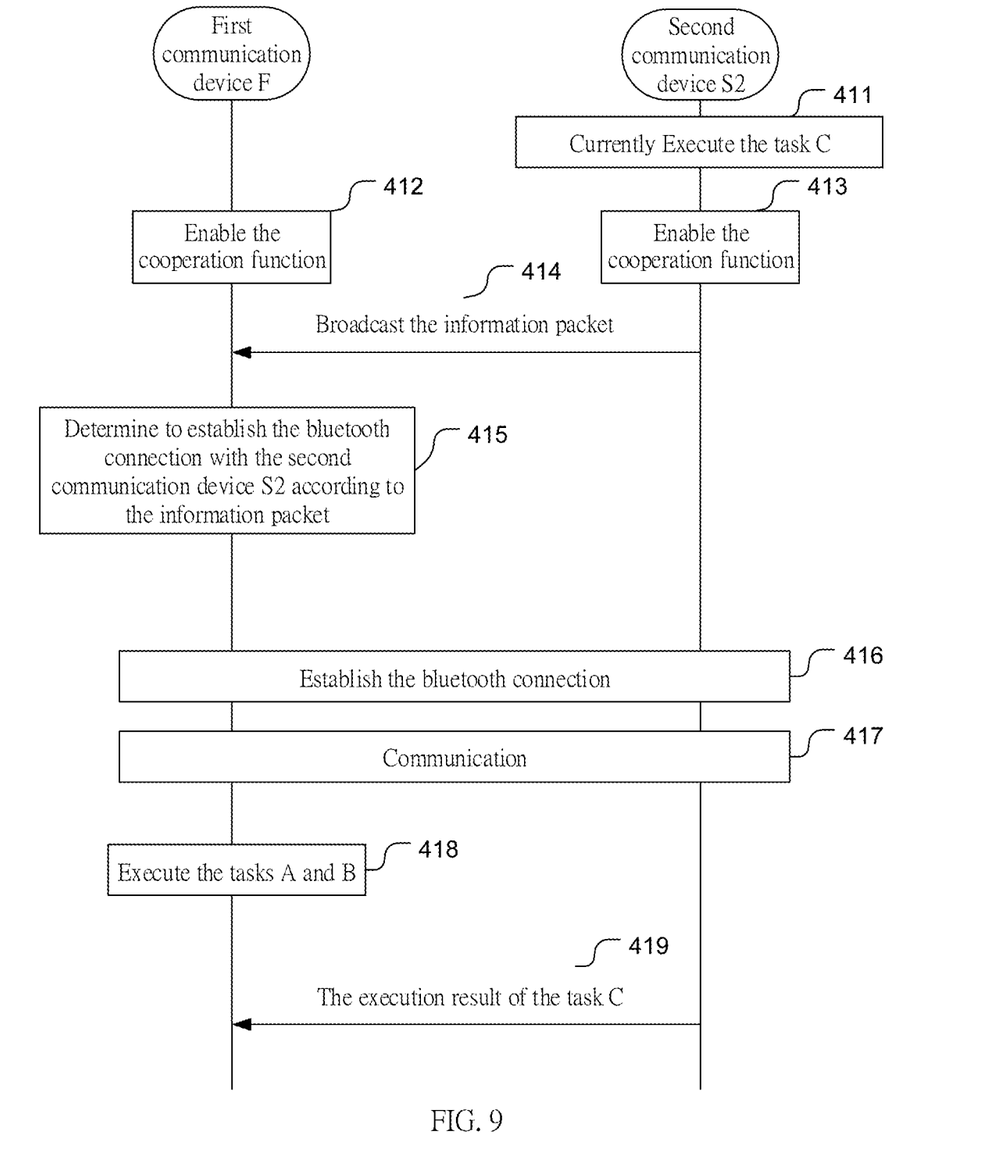
FIG. 9 illustrates an exemplary process of the bluetooth communication between the first communication device and the second communication device according to another embodiment of the present invention.

The following can be referenced with the figure, which illustrates the process of bluetooth communication between the first communication device F and a different second communication device, wherein the first communication device F needs to execute the tasks A, B and C, and the time assigned to the task C by the first communication device F is not enough. Features in the figure that similar to those mentioned in the previous embodiments are omitted here for brevity.

As shown in FIG. 8, the first communication device F cooperates with the second communication device S1 in order to finish the execution of the tasks A, B and C of the first communication device F, wherein the second communication device S1 is capable of executing the task C. The detailed operations are as follows:

Step 311: the first communication device F enables the cooperation function, wherein the first communication device F uses the tci_collaborator_enable command to enable the cooperation function.

Step 312: the second communication device S1 enables the cooperation function, wherein the second communication device S1 uses the tci_collaborator_enable command to enable the cooperation function.

Step 313: the second communication device S1 broadcasts the information packet, wherein the information packet at least comprises: the indication information for indicating that the second communication device S1 is capable of executing the task C.

Specifically, the information packet comprises: the indication information for indicating that the second communication device S1 is capable of providing the idle resource. Moreover, the information packet further comprises: the indication information for indicating the idle time length of the idle resource that can be provided by the second communication device S1. The content of the information packet may further comprise: the indication information that indicates whether there is an expertise function. The detailed descriptions of the expertise function are similar to those mentioned in the previous embodiments, and are omitted here for brevity.

Step 314: the first communication device F determines to establish the bluetooth connection with the second communication device S1 according to the information packet. Specifically, the information packet comprises the indication information for indicating that the second communication device S1 is capable of providing the idle resource, so that the first communication device F may determines to establish the bluetooth connection with the second communication device S1 according to the information packet. Moreover, the information packet further comprises the indication information for indicating the idle time length of the idle resource that can be provided by the second communication device S1. Hence, according to the information packet, the first communication device F may determine that the relationship between the time length required for the first communication device F to execute the task C and the idle time length of the idle resource satisfies the predetermined condition, and thereby determine to establish the bluetooth connection with the second communication device S1.

Step 315: the first communication device F sends a respond signal to the second communication device S1, the first communication device F establishes bluetooth connection with the second communication device S1.

Step 316: the first communication device F communicates with the second communication device S1, in order to allocate the task C of the first communication device F to the second communication device S1 for execution.

Step 317: the second communication device S1 executes the task C.

Step 318: the first communication device F executes the tasks A and B.

Step 319: the second communication device S1 sends the execution result of the task C to the first communication device F.

It is noted that Steps 311 and 312, and Steps 317 and 318 may be executed without following the numerical order. For example, Steps 311 and 312 may be executed simultaneously. In the embodiment, the detailed descriptions of the first communication device F and the second communication device S1 can be seen in the previous embodiments, and are thus omitted here for brevity.

As shown in FIG. 9, the first communication device F cooperates with the second communication device S2 in order to finish the execution of the tasks A, B and C of the first communication device F, wherein the second communication device S2 is capable of executing the task C. The detailed procedure is as follows.

Step 411: the second communication device S2 is executing the task C.

Step 412: the first communication device F enables the cooperation function, wherein the first communication device F uses the tci_collaborator_enable command to enable the cooperation function.

Step 413: the second communication device S2 enables the cooperation function, wherein the second communication device S2 uses the tci_collaborator_enable command to enable the cooperation function.

Step 414: the second communication device S2 broadcasts an information packet which at least comprises: the indication information for indicating that the second communication device S2 is capable of executing the task C. Specifically, the information packet comprises the indication information for indicating that the second communication device S2 is executing the task C. Moreover, the information packet further comprises the indication information for indicating the time length required for the task C being executed by the second communication device S2.

Step 415: the first communication device F determines to establish the bluetooth connection with the second communication device S2 according to the information packet.

The information packet comprises the indication information for indicating that the second communication device S2 is executing the task C, so that the first communication device F determines to establish the bluetooth connection with the second communication device S2 according to information packet. Moreover, the information packet further comprises the indication information for indicating the time length required for the task C being executed by the second communication device S2, and the first communication device F determines that the relationship between the time length required by the first communication device F to execute the task C and the time length required by the second communication device S2 to execute the task C satisfies a predetermined condition, so that the first communication device F may determine to establish the bluetooth connection with the second communication device S2.

Step 416: the first communication device F sends a respond signal to the second communication device S2, and the first communication device F establishes the bluetooth connection with the second communication device S2.

Step 417: the first communication device F communicates with the second communication device S2.

Step 418: the first communication device F executes the tasks A and B.

Step 419: the second communication device S2 sends the execution result of the task C to the first communication device F.

It is noted that the execution order of Steps 412 and 413 and the execution order of Steps 418 and 419 may be implemented without following the numerical order. For example, Steps 412 and 413 may be simultaneously executed.

Figure 10:
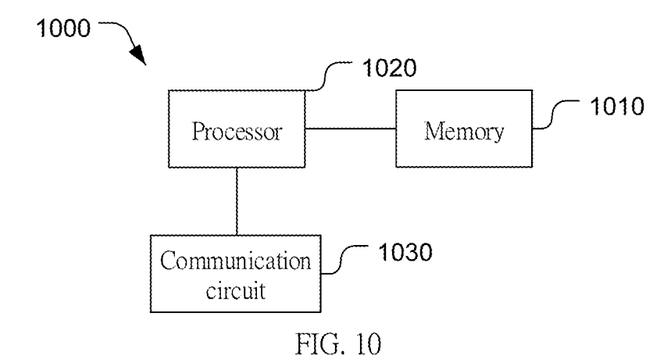
FIG. 10 is a diagram illustrating the architecture of the communication device according to the first embodiment of the present invention.

FIG. 10 is a diagram illustrating the architecture of the communication device according to the first embodiment of the present invention. The communication device 1000 may be applied to the aforementioned first communication device. The communication device comprises a memory 1010, a processor 1020 and a communication circuit 1030. The memory 1010 and the communication circuit 1030 are connected to the processor 1020 respectively.

The memory 1010 may comprise a read-only memory (ROM) and/or a random access memory, and may provide commands and data to the processor 1020. A portion of the memory 1010 may further comprise a non-volatile random access memory (NVRAM). Commands stored in the memory 1010 can be executed to realize any of the methods provided in the first to fifth embodiments of the present invention, or any non-conflicting combination thereof.

The communication circuit 1030 is arranged to transmit and receive data, and is an interface for communicating to other devices.

The processor 1020 is arranged to use the communication circuit 1030 to execute the bluetooth communication methods in the first to fifth embodiment of the present invention.

The processor 1020 may be an integrated circuit chip that has the signal processing ability. In an actual process, each step in the aforementioned method may be finished by using the integrated logic circuit in the hardware of the processor 1020, or by using commands in a software manner. The aforementioned processor 1020 may be a general purpose processor, digital signal processor (DSP), application specific integrated circuit (ASIC), Field Programmable Gate Array (FPGA) or other programmable logic devices, discrete or transistor logic component, discrete hardware element, which can implement or execute various methods, steps and logic block diagrams disclosed in the present invention embodiment.

Figure 11:
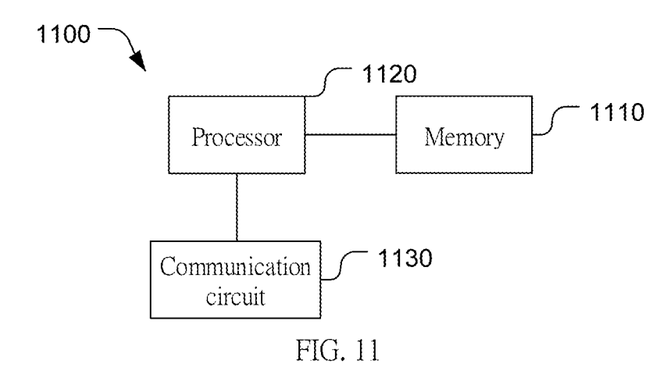
FIG. 11 is a diagram illustrating the architecture of the communication device according to the second embodiment of the present invention.

FIG. 11 is a diagram illustrating the architecture of the communication device according to the second embodiment of the present invention. The communication device 1100 may be applied in the aforementioned second communication device. The communication device 1100 comprises a memory 1110, a processor 1120 and a communication circuit 1130. The memory 1110 and the communication circuit 1130 are connected to the processor 1120 respectively.

The memory 1110 may comprise a read-only memory (ROM) and/or a random access memory, and may provide commands and data to the processor 1120. A portion of the memory 1110 may further comprise non-volatile random access memory (NVRAM). Commands stored in the memory 1110 can be executed to realize any of the methods provided in the sixth to seventh embodiments of the present invention, or any non-conflicting combination thereof.

The communication circuit 1130 is arranged to transmit and receive data, and is an interface for communicating to other devices.

The processor 1120 is arranged to use the communication circuit 1130 to execute the bluetooth communication methods in the sixth to seventh embodiments of the present invention.

The processor 1120 may be an integrated circuit chip that has the signal processing ability. In an actual process, each step in the aforementioned method may be finished by using the integrated logic circuit in the hardware of the processor 1120, or by using commands in a software manner. The aforementioned processor 1120 may be a general purpose processor, digital signal processor (DSP), application specific integrated circuit (ASIC), Field Programmable Gate Array (FPGA) or other programmable logic devices, discrete or transistor logic component, discrete hardware element, which can implement or execute various methods, steps and logic block diagrams disclosed in the present invention embodiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bluetooth communication method, comprising:
a first communication device establishing a bluetooth connection with a second communication device, wherein the first communication device is configured to execute multiple tasks;
the first communication device communicating with the second communication device through the bluetooth connection, to allocate at least one task of the multiple tasks to the second communication device for execution, wherein the at least one task comprises a scan task; and
the first communication device receiving an execution result of the at least one task from the second communication device through the bluetooth connection;
wherein the step of the first communication device establishing the bluetooth connection with the second communication device comprises:
the first communication device receiving an information packet broadcasted by the second communication device, wherein the information packet comprises: indication information for indicating whether the second communication device is capable of providing an idle resource, wherein the idle resource is an idle bluetooth communication frequency band; and
the first communication device establishing the bluetooth connection with the second communication device capable of providing the idle resource according to the information packet.

2. The bluetooth communication method of claim 1, wherein:
the information packet further comprises: indication information for indicating an idle time length of the idle resource that can be provided by the second communication device; and
the step of the first communication device establishing the bluetooth connection with the second communication device capable of providing the idle resource according to the information packet comprises:
when a relationship between a time length required for the first communication device to execute the at least one task and the idle time length of the idle resource satisfies a predetermined condition, the first communication device establishes the bluetooth connection with the second communication device.

3. The bluetooth communication method of claim 1, wherein:
the information packet further comprises indication information for indicating whether the second communication device has an expertise function, wherein the expertise function comprises a function of filtering an search result from executing the scan task;
the step of the first communication device establishing the bluetooth connection with the second communication device capable of providing the idle resource according to the information packet comprises:

when the second communication device has the expertise function, the first communication device establishes the bluetooth connection with the second communication device.

4. The bluetooth communication method of claim 1, wherein the first communication device communicating with the second communication device through the bluetooth connection, to allocate the at least one task to the second communication device comprises:
according to the time length required by the first communication device to execute the at least one task and the time length that the second communication device is capable of executing the at least one task, the first communication device determining an actual time length that the second communication device executes the at least one task; and
sending an notification message to the second communication device, wherein the notification message comprises: indication information for indicating the second communication device to execute the at least one task, and indication information for indicating the actual time length.

5. The bluetooth communication method of claim 4, further comprising:
determining at least one specific channel for which the scan task is executed; and
when the at least one specific channel comprises multiple specific channels, determining a time length corresponding to each of the specific channels, wherein the actual time length equal to a summation of the time length corresponding to each of the specific channels;
wherein the indication information for indicating the actual time length comprises: indication information for indicating a specific channel for which the scan task is executed, and indication information for indicating the time length corresponding to each of the specific channels.

6. A bluetooth communication method, comprising:
a second communication device establishing a bluetooth connection with a first communication device;
the second communication device communicating with the first communication device through the bluetooth connection, in order to receive an indication for executing at least one task of the first communication device, wherein the at least one task comprises a scan task;
the second communication device executing the at least one task; and
the second communication device sending an execution result of the at least one task to the first communication device through the bluetooth connection;
wherein the step of the second communication device establishing the bluetooth connection with the first communication device comprises:
the second communication device broadcasting an information packet, wherein the information packet at least comprises: indication for indicating whether the second communication device is capable of providing an idle resource, wherein the idle resource is an idle bluetooth communication frequency band; and
the second communication device receiving a respond signal sent by the first communication device according to the information packet, and establish the bluetooth connection with the first communication device, wherein the respond signal is sent when the indication information received by the first communication device indicates that the second communication device is capable of providing the idle resource.

7. The bluetooth communication method of claim 6, wherein:
the information packet further comprises: indication information for indicating an idle time length of the idle resource that can be provided by the second communication device;
the respond signal is transmitted when the relationship between the time length required for the first communication device to execute the at least one task and the idle time length of the idle resource satisfies the predetermined condition.

8. The bluetooth communication method of claim 7, wherein:
the information packet further comprises: indication information for indicating whether the second communication device has an expertise function, wherein the expertise function at least comprises: a function of filtering a search result obtained from executing the scan task; and
the respond signal is transmitted when the relationship between the time length required for the first communication device to execute the at least one task and the idle time length of the idle resource satisfies the predetermined condition and the second communication device is determined to have the expertise function.

9. The bluetooth communication method of claim 6, wherein:
the information packet further comprises: indication information for indicating whether the second communication device has an expertise function, wherein the expertise function at least comprises: a function of filtering a search result obtained from executing the scan task; and
the respond signal is transmitted when the relationship between the time length required for the first communication device to execute the at least one task and the idle time length of the idle resource satisfies the predetermined condition and the second communication device is determined to have the expertise function.

* * * * *